United States Patent
Hanel et al.

(10) Patent No.: US 12,495,005 B1
(45) Date of Patent: Dec. 9, 2025

(54) PROGRAMMABLE PROCESSING OF NETWORK PROTOCOL PACKETS

(71) Applicant: Chelsio Communications, Inc., Sunnyvale, CA (US)

(72) Inventors: John Hanel, Sunnyvale, CA (US); Balekudru Krishna, Sunyvale, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 85 days.

(21) Appl. No.: 18/614,311

(22) Filed: Mar. 22, 2024

(51) Int. Cl.
  *H04L 47/35* (2022.01)

(52) U.S. Cl.
  CPC .................... *H04L 47/35* (2013.01)

(58) Field of Classification Search
  CPC ........................................ H04L 47/35
  USPC ........................................... 709/238
  See application file for complete search history.

(56) References Cited

U.S. PATENT DOCUMENTS

| | | | |
|---|---|---|---|
| 7,957,378 B2* | 6/2011 | Panigrahy | H04L 69/22 709/227 |
| 12,003,422 B1* | 6/2024 | Baumann | H04L 45/7453 |
| 2006/0015645 A1* | 1/2006 | Ocko | H04L 67/59 709/238 |
| 2022/0405120 A1* | 12/2022 | Weishaupt | G06F 9/5016 |
| 2023/0117644 A1* | 4/2023 | Kamisetty | H04L 49/354 370/254 |
| 2023/0336465 A1* | 10/2023 | Lewin | H04L 63/0227 |
| 2024/0223353 A1* | 7/2024 | Raman | H04L 7/10 |

* cited by examiner

*Primary Examiner* — Wing F Chan
*Assistant Examiner* — John Fan
(74) *Attorney, Agent, or Firm* — Lee & Hayes, P.C.

(57) ABSTRACT

System and methods for processing state-based network packets are described herein. Processing of network protocol packets can include classifying events associated with the network protocol packet based on a current, internal protocol state and event type. The techniques may map these events to actions. For instance, the techniques may map these incoming events to specific indices within a TCAM. The indices may be used to lookup "actions" encoded within an SRAM. The system may utilize these actions to generate one or more outgoing messages as well as determine possible "next" state transitions. Accordingly, by utilizing contents of a TCAM and SRAM, the techniques may facilitate dynamic and flexible programmability of processing network protocol packets.

20 Claims, 6 Drawing Sheets

PROGRAMMABLE PROCESSING OF NETWORK PROTOCOL PACKETS

TECHNICAL FIELD

The present disclosure relates generally to the field of computer networking circuitry, and more particularly to enabling programmable processing of network protocol packets based on an internally maintained protocol state and by utilizing ternary content-addressable memory (TCAM) and static random access memory (SRAM).

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

In computer networking circuitry, when a network protocol packet is received, various processing functions are performed. For instance, the network protocol packet may be received via a pipeline (also referred to as the "wire"). When the network protocol packet is received, computer networking circuitry may require protocol processing of the incoming packets based on each packet's attributes and an internal state. This processing may need to be modified dynamically based on changing protocol rules, new packet attributes, or a newly identified internal state.

Generally, hardcoded circuitry is utilized to perform state-based processing of network protocol packets. However, implementing changes to processing in hardcoded circuitry is difficult, time consuming, and costly. As such, by the time a change is made based on a first change in a protocol rule, a second change is required. Accordingly, existing hardcoded circuitry lacks the ability to implement changes or modifications to state based processing of network protocol packets in a dynamic or flexible way.

Accordingly, there is a need for a dynamic flexible way to perform processing of network protocol packets.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

The present disclosure relates generally to the field of computer networking circuitry, and more particularly to enabling programmable processing of network protocol packets based on an internally maintained protocol state and by utilizing a TCAM and SRAM.

A method to perform the techniques described herein may be implemented by computer networking circuitry. The method may include receiving, via a network connection, a network packet. The method may include generating, based at least in part on the network packet and a current state of the network connection, an event key. The method may include performing, by first memory, a first processing phase. The first processing phase may comprise determining, using the event key, whether the event key matches one or more conditions stored in the first memory; generating, based on the event key and the one or more conditions, an index associated with the one or more conditions; and outputting, by the first memory, the index to second memory. The method may include performing, by the second memory, a second processing phase. The second processing phase may comprise determining, based at least in part on the index, an opcode set comprising one or more actions; generating, one or more messages associated with the one or more actions; and transmitting the one or more messages to one or more recipients.

Additionally, any techniques described herein, may be performed by a system and/or apparatus having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

EXAMPLE EMBODIMENTS

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

In computer networking circuitry, when a network protocol packet is received, various processing functions are performed. For instance, the network protocol packet may be received via a pipeline (also referred to as the "wire"). When the network protocol packet is received, computer networking circuitry may require protocol processing of the incoming packets based on each packet's attributes and an internal state. This processing may need to be modified dynamically based on changing protocol rules, new packet attributes, or a newly identified internal state.

Generally, hardcoded circuitry is utilized to perform state-based processing. However, implementing changes to processing in hardcoded circuitry is difficult, time consuming, and costly. As such, by the time a change is made based on a first change in a protocol rule, a second change is required. Accordingly, existing hardcoded circuitry lacks the ability to implement changes or modifications to state based processing of network protocol packets in a dynamic or flexible way.

Accordingly, there is a need for a dynamic flexible way to perform processing of network protocol packets.

This disclosure describes techniques and mechanisms for a system to provide dynamic, state-based programmable processing of network packets. In some examples, the system may be implemented by computer networking circuitry. In some examples, the system may receive, via a network connection, a network packet. The system may generate, based at least in part on the network packet and a current state of the network connection, an event key. The system may perform, by first memory, a first processing phase. In some examples, the first processing phase may comprise determining, using the event key, whether the event key matches one or more conditions stored in the first memory; generating, based on the event key and the one or more conditions, an index associated with the one or more conditions; and outputting, by the first memory, the index to second memory. The system may perform, by the second memory, a second processing phase. The second processing phase may comprise determining, based at least in part on the index, an opcode set comprising one or more actions; generating, one or more messages associated with the one or more actions; and transmitting the one or more messages to one or more recipients.

In some examples, the system may comprise a network processing system. For instance, the network processing system may be implemented in hardware circuitry that includes an input phase module, an output phase module, and a current state module. In some examples, the system may receive a network packet (e.g., a network protocol packet) via a network connection that utilizes transmission control protocol (TCP).

In some examples, the input phase module comprises an event key generator and ternary content-addressable memory (TCAM). In some examples, the TCAM comprises a 3-state TCAM. In some examples, the event key generator is configured to receive network packet(s) via the connection (also referred to as the "wire" or "pipeline"). In some examples, the network packet(s) may comprise data (e.g., sequence number(s) associated with a current sequence of data to be sent to a peer; an indication of how many data packets the system is receiving from a peer; an indication of how many data packets the system has acknowledged; an indication of how many data packets the peer has acknowledged (e.g., the system has received); window sizes associated with respective data packet(s); payload; etc.).

The event key generator is also configured to receive a current state from the current state module. The event key generator may generate an event key based on the current state and the data of the network packet. In some examples, the event key generator may encode the current state and the data into an event and may present the event in the form of a key (e.g., as an event key) at the inputs of the TCAM.

In some examples, the event key generator may output an event key to the TCAM. In some examples, the TCAM comprises a plurality of bits. In some examples, each bit within the TCAM represents logical information associated with a network packet. For instance, a first bit may represent a state of the TCP connection. For instance, the TCP connection may comprise 1 of 10 possible states. Accordingly, the first bit may be set to 1 of the 10 possible TCP states. A second bit may indicate whether the sequence number of the network packet is received is in order, a third bit may indicate if the sequence number is out of order, and a fourth bit may indicate whether there is no data received at all.

In some examples, each TCAM entry has a width equal to the width of the event key bits. In some examples, at each bit location within the mask of a particular TCAM entry, the values may comprise 1 of 3 states, (e.g., 0, 1 or X (implying don't-care)). For example, where mask bit $[i]==0$ results in a bit-wise match if the value of key bit $[i]$ presented is 0; where mask bit $[i]==1$ results in a bit-wise match if the value of key bit $[i]$ presented is 1; and/or where mask bit $[i]==X$ results in a bit-wise match for key bit $[i]$ values=$\{0,1\}$.

In some examples, the TCAM is configured to perform a lookup process using the event key. In some examples, individual bits of the key are matched against all the bits of each TCAM entry in parallel. For example, if the $4^{th}$ bit of an event key is "0" and if the 7th TCAM entry has a mask with its $4^{th}$ bit of value "0" or "X", then it results in a bit-wise match. On the other hand, if the $7^{th}$ TCAM entry has a mask with its $4^{th}$ bit of value "1", then it will not result in a bit-wise match. In some examples, the lookup process within the TCAM is configured to establish a mapping between each event key and an index location within. In some examples, the lookup process within the TCAM may output a result indicating either a "hit" on a specific entry index within the TCAM or a "miss", i.e., no TCAM entry index matching with the presented TCAM key. Each TCAM index location's hit or miss status may be output to a multiplexer present at the output of the TCAM.

In some examples, the TCAM multiplexer generates an "index", which represents the first index location at which there is a match. In some examples, the range of indices generated by the TCAM is limited to the size of a Static Random Access Memory (SRAM). Accordingly, the lookup process establishes a mapping between each event "key" and a possible "index".

In some examples, each TCAM entry's mask may represent a condition with as many bits as there exists in the event key. Accordingly, in order for a TCAM entry to match a presented key, the lookup process may determine there is a bit-wise match across all bits within that mask relative to the key presented. Thus, in some examples, the contents of the TCAM may be viewed as a large "if-elseif . . . elseif . . . else . . . " construct which may route any incoming event key to a particular "index" which encodes the "action" to be taken for the processing of that event key. In some examples, the TCAM performs the lookup process according to a variable number of cycles. For instance, the number of cycles may depend upon the latency of the specific TCAM being used. In some examples, once the TCAM lookup process is complete, a multiplexer present at the output of the TCAM may combine the outputs from the bits to generate an index. In some examples, the index may map to a memory location within the output phase module that comprises one or more opcode sets.

In some examples, the input phase module may output the index to the output phase module. In some examples, the output phase module comprises static random-access memory (SRAM). For instance, the index may be fed into a read address bus of the SRAM.

In some examples, the SRAM may comprise a plurality of memory locations, with each bit comprising an opcode set. For instance, each opcode set may correspond to one or more encoded actions. As an example, each encoded action within the SRAM at any given index location may comprise one or more of 3 types of "opcodes". Each opcode encodes one of three types of processing actions. The processing actions may include one or more of action opcodes that generate messages to the wire (e.g., to the network), action opcodes that generate messages to the core (e.g., to the host device), and/or action opcodes that determines the "next" state transition. In some examples, the SRAM may be configured such that a group of incoming events (e.g., packets of a particular type) map to a certain opcode set at index=x of the SRAM, while another group of incoming events (e.g., packet of a different type) map to a different opcode set at index=y of the SRAM.

In some examples, the SRAM may perform a read operation to identify an opcode set associated with the index received from the input phase module. For instance, the read operation of the SRAM may identify, based on the index received from the input phase module, a corresponding opcode set associated with actions. In some examples, the SRAM may output the "action" opcodes present at the specified index. In some examples, the opcode set encodes various wire messages to be generated, core or host messages to be generated, and encodings for the state transitions that need to be performed.

For instance, the SRAM may send the opcode set to one or more demultiplexers connected to the SRAM data outputs and included as part of the output phase module. In some examples, the demultiplexers may be configured to decode the opcode set and generate message(s) associated with the action(s) identified. For instance, the output phase module may generate one or more of a message to the wire, a message to the host, and/or a message to the current state module (e.g., comprising the next state transition).

In some examples, the current state module is configured to maintain an internal state associated with a connection. For instance, when a network packet is received, the current state module may store a first state associated with the network connection. After the network packet has been processed, the current state module may receive a message from the output phase module, indicating a state transition. The current state module may update the first state to a second state indicated by the state transition. In some examples, the internal state corresponds to one or more transmission control block state(s). In some examples, the internal state comprises a TCP specific state (e.g., established connection, connection is being set up, connection is being torn down, etc.).

In some examples, the action(s) within the opcode sets of the SRAM are programmable, such that an administrator may change an action associated with a particular index location. For examples, index location "1" within the SRAM may be associated with a first wire message. In some examples, the administrator may change the action, such that index location "1" may be associated with a second wire message. In some examples, such changes may be implemented as part of a software update.

In some examples, the TCAM is programmable, such that classification of an incoming network packet can be dynamically changed. For instance, a network administrator may need or want to change how a particular packet type in a particular internal state is handled. For instance, a packet may be received in an established state and comprises a new acknowledgement of data that the system had previously sent, and the window is open, the event key associated with the packet may match bit(s) within the TCAM that generate index location "3" as an output. The network administrator may dynamically update the TCAM such that a network packet comprising the same information, may map to bits in the TCAM that generate index location "1" as an output, thereby mapping to a different set of opcode action(s) within the SRAM.

In this way, the system may process stateful network protocol packets in a flexible manner. For instance, the system may enable a network administrator to reprogram the mapping between individual events-derived from wire packet attributes and/or internal protocol state- and various types of protocol actions, as well as dynamically reprogram the individual processing actions associated with these types of events. For instance, by utilizing a TCAM, the system may dynamically reprogram this "if/then/else" construct in order to dynamically reroute events to different actions. Further, by encoding opcode sets into the SRAM, the system may enable an administrator to dynamically modify one individual aspect of an action opcode (e.g., such as a wire message generation, host message generation or next state transition) without changing the other action opcodes present within the same index location and/or same opcode set.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
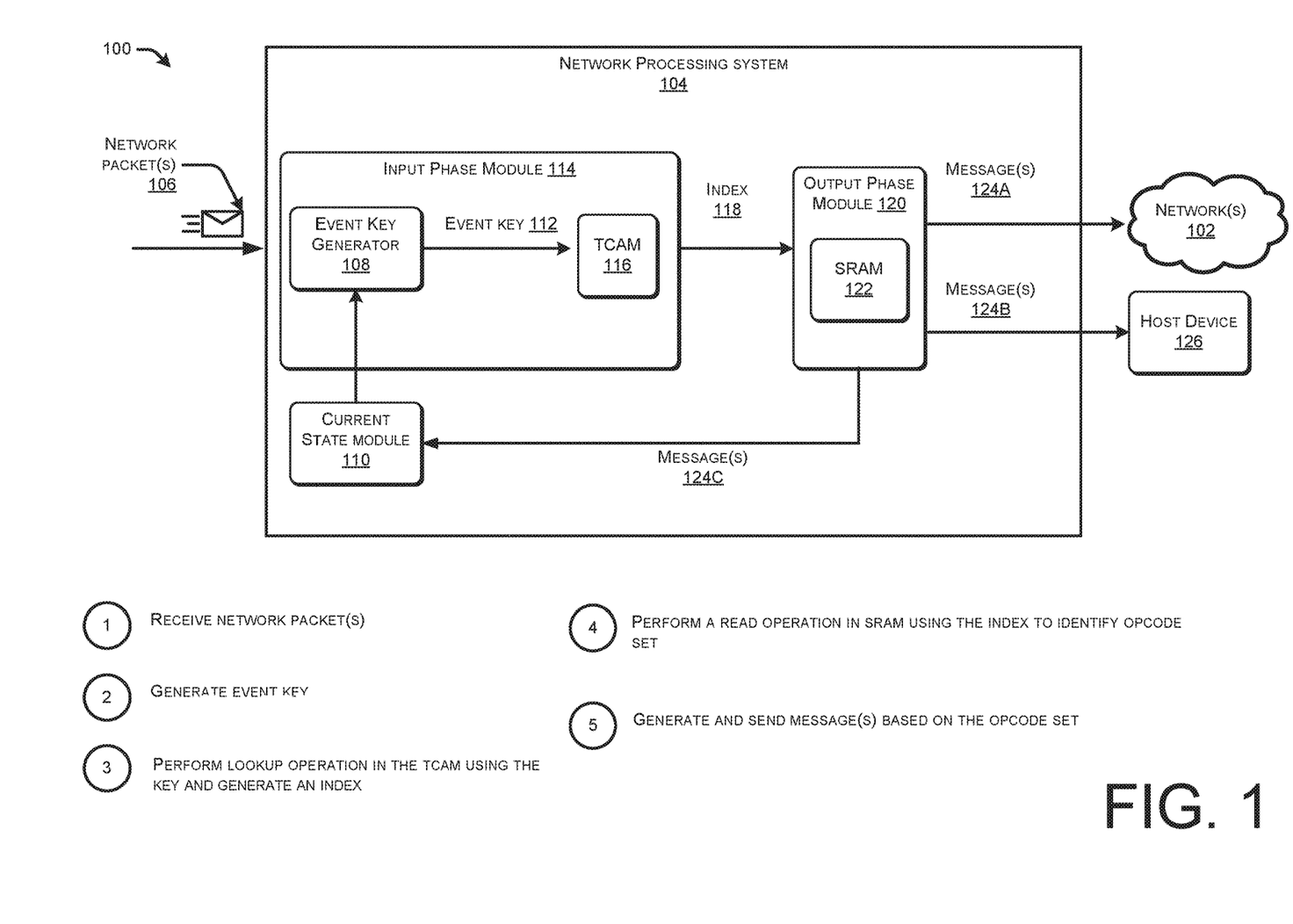
FIG. 1 illustrates a system-architecture diagram of an environment in which a system can provide dynamic and flexible programmability for processing of network packets.

FIG. 1 illustrates a system-architecture diagram of an environment in which a system 100 can provide dynamic and flexible programmability for processing of network packets. While the system 100 shows an example network processing system 104, it is understood that any of the components of the system may be implemented on any device in the network 102. Moreover, while the system 100 shows the example network processing system 104 as being separate from the host device 126, it is understood that the network processing system 104 (and/or any of the components of the network processing system 104) may be implemented by hardware and/or circuitry of the host device 126. Further, while the system 100 shows the example event key generator 108 as being included as part of the input phase module 114, it is understood that the event key generator 108 may be separate from the input phase module 114 while still being included as part of the network processing system 104.

In some examples, the system 100 may include a network 102 that includes network devices. The network 102 may include one or more networks implemented by any viable communication technology, such as wired and/or wireless modalities and/or technologies. The network 102 may include any combination of Personal Area Networks (PANs), SDCI, Local Area Networks (LANs), Campus Area Networks (CANs), Metropolitan Area Networks (MANs), extranets, intranets, the Internet, short-range wireless communication networks (e.g., ZigBee, Bluetooth, etc.), RA VPNs, VPNs, ZTNA, Wide Area Networks (WANs)-both centralized and/or distributed- and/or any combination, permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers.

The system 100 may comprise a network processing system 104. As noted above, the network processing system may be implemented in hardware circuitry. The network processing system 104 may comprise an input phase module 114, an output phase module 120, and a current state module 110.

In some examples, the network processing system 104 may be configured to receive network packet(s) 106. In some examples, the network packet(s) 106 correspond to network protocol packet(s). In some examples, the network packet(s) 106 comprise data (e.g., sequence number(s) associated with a current sequence of data to be sent to a peer; an indication of how many data packets the system is receiving from a peer; an indication of how many data packets the system has acknowledged; an indication of how many data packets the peer has acknowledged (e.g., the system has received); window sizes associated with respective data packet(s); payload; etc.).

In some examples, the network packet(s) 106 are received via network(s) 102, which may represent a pipeline and/or other network connection that utilizes TCP. In some examples, the network packet(s)

In some examples, the input phase module 114 comprises an event key generator 108 and ternary content-addressable memory (TCAM) 116. In some examples, the TCAM 116 comprises a 3-state TCAM. In some examples, the event key generator 108 is configured to receive network packet(s) 106 via the connection (also referred to as the "wire" or "pipeline").

The event key generator 108 is also configured to receive a current state from the current state module 110. The event key generator 108 may generate an event key 112 based on the current state and the data of the network packet(s) 106. In some examples, the event key generator 108 may encode the current state and the data into an event and may present the event in the form of a key (e.g., as an event key 112) at the various inputs of the TCAM 116.

In some examples, the event key generator 108 may output an event key 112 to the TCAM 116. In some examples, the TCAM 116 comprises a plurality of bits. In some examples, each bit within the TCAM 116 represents logical information associated with a network packet. For instance, a first bit may represent a state of the TCP connection. For instance, the TCP connection may comprise 1 of 10 possible states. Accordingly, the first bit may be set to 1 of the 10 possible TCP states. A second bit may indicate whether the sequence number of the network packet is received is in order, a third bit may indicate if the sequence number is out of order, and a fourth bit may indicate whether there is no data received at all.

In some examples, the TCAM 116 is configured to perform a lookup process using the event key 112. In some examples, individual bits of the key are matched against all the bits of each TCAM entry in parallel. For example, if the $4^{th}$ bit of an event key is "0" and if the $7^{th}$ TCAM entry has a mask with its $4^{th}$ bit of value "0" or "X", then it results in a bit-wise match. On the other hand, if the $7^{th}$ TCAM entry has a mask with its $4^{th}$ bit of value "1", then it will not result in a bit-wise match. In some examples, the lookup process within the TCAM is configured to establish a mapping between each event key and an index location within. In some examples, the lookup process within the TCAM may output a result indicating either a "hit" on a specific entry index within the TCAM or a "miss", i.e., no TCAM entry index matching with the presented TCAM key. Each TCAM index location's hit or miss status may be output to a multiplexer present at the output of the TCAM.

In some examples, the TCAM multiplexer generates an index 118, which represents the first index location at which there is a match. In some examples, the lookup process establishes a mapping between each event "key" and a possible index location within the SRAM 122.

In some examples, the input phase module 114 may output the index 118 to the output phase module 120. In some examples, the output phase module 120 comprises static random-access memory (SRAM) 122. For instance, the index 118 may be fed into a read address bus of the SRAM 122.

In some examples, the SRAM 122 may comprise a plurality of memory locations, with each bit comprising an opcode set. For instance, each opcode set may correspond to one or more encoded actions. As an example, each encoded action within the SRAM 122 at any given index location may comprise one or more of 3 types of "opcodes". Each opcode encodes one of three types of processing actions. The processing actions may include one or more of action opcodes that generate messages to the wire (e.g., to the network), action opcodes that generate messages to the core (e.g., to the host device), and/or action opcodes that determines the "next" state transition.

In some examples, the SRAM 122 may perform a read operation to identify an opcode set associated with the index 118 received from the input phase module 114. In some examples, the SRAM may output the "action" opcodes present at the specified index 118. For instance, the SRAM 122 may send the opcode set to one or more demultiplexers connected to the SRAM data outputs (not illustrated) and included as part of the output phase module 120. In some examples, the demultiplexers may be configured to decode the opcode set and generate message(s) (illustrated as message(s) 124A, message(s) 124B, and message(s) 124C) associated with the action(s) identified. For instance, the output phase module 120 may generate one or more message(s) 124A to the wire (e.g., network(s) 102), message(s) 124B to a host device 126, and/or message(s) 124C to the current state module 110. In some examples, the network processing system 104 may be implemented as hardware circuitry on the host device 126.

In some examples, the current state module is configured to maintain an internal state associated with a connection. For instance, when a network packet is received, the current state module may store a first state associated with the network connection. After the network packet has been processed, the current state module may receive a message from the output phase module, indicating a state transition. The current state module may update the first state to a second state indicated by the state transition. In some examples, the internal state corresponds to one or more transmission control block state(s). In some examples, the internal state comprises a TCP specific state (e.g., established connection, connection is being set up, connection is being torn down, etc.).

At "1", the system may receive network packet(s). For instance, the network packet(s) may correspond to network packet(s) 106. As noted above, the input phase module 114 of the network processing system 104 may receive network packet(s) 106.

At "2", the system may generate an event key. For instance, the event key generator 108 of the input phase module 114 may generate event key 112 based on the network packet(s) 106 and a current state received form the current state module 110.

At "3", the system may perform a lookup operation in the TCAM using the event key and may generate an index. For instance, the TCAM corresponds to TCAM 116. The event key generator 108 may output event key 112 to the TCAM 116, such that the TCAM may perform a lookup operation. As noted above the TCAMP may compare the individual bits of the event key 112 to all the bit(s) within each entry of the TCAM in parallel. As noted above, Each TCAM index location's hit or miss status may be output to a multiplexer present at the output of the TCAM 116 and included as part of the input phase module 114. In some examples, the TCAM multiplexer generates index 118 using the hit or miss status(es), which represents the first index location at which there is a match associated with a location in the SRAM 122. For instance, the index 118 may map to a memory location within the output phase module 120 that comprises one or more opcode sets.

At "4", the system may perform a read operation in the SRAM using the index to identify an opcode set. For instance, the input phase module 114 may output the index 118 to the output phase module 120. For instance, the index 118 may be input using a read address bus of the SRAM 122. In some examples, the read operation of the SRAM 122 may identify, based on the index 118, a corresponding opcode set associated with actions. In some examples, the opcode set encodes various wire messages to be generated, host messages to be generated, and encodings for the state transitions that need to be performed. In some examples, the SRAM 122 may output the "action" opcodes present at the specified index. For instance, the SRAM 122 may send the opcode set to one or more demultiplexers connected to the SRAM data outputs and included as part of the output phase module 120.

At "5", the system may generate and send message(s) based on the opcode set. For instance, the system may generate and send message(s) using the demultiplexers of the output phase module 120. In some examples, the demultiplexers may be configured to decode the opcode set and generate message(s) associated with the action(s) identified. For instance, the output phase module 120 may generate one or message(s) 124A to the wire (e.g., network 102), message(s) 124B to the host device 126, and/or message(s) 124C (e.g., comprising the next state transition) to the current state module 110.

In this way, the system may process stateful network protocol packets in a dynamic and flexible manner. For instance, the system can reprogram the mapping between individual events-derived from wire packet attributes and/or the internal protocol state (e.g., stored within the current state module)- and various types of protocol actions as well as dynamically reprogram the individual processing actions associated with these types of events. For instance, by utilizing a TCAM, the system may dynamically reprogram this "if/then/else" construct in order to dynamically reroute events to actions. Further, by encoding opcode sets into the SRAM, the system may enable an administrator to dynamically modify one individual aspect of an action opcode (e.g., such as a wire message generation, host message generation or next state transition) without changing the other action opcodes present within the same index location and/or same opcode set.

Figure 2:
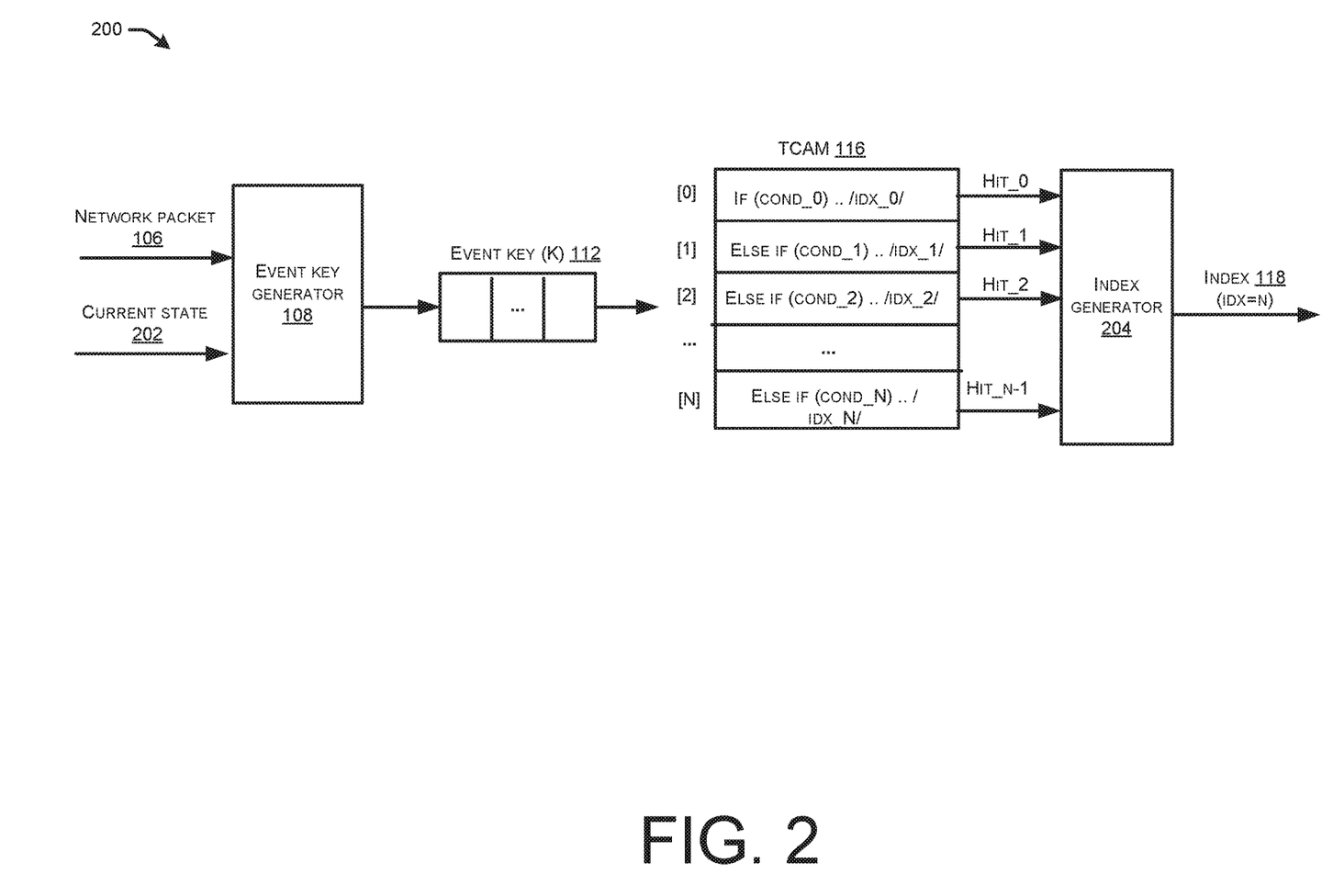
FIG. 2 illustrates an example environment showing exemplary inputs and outputs of the input phase module of the network processing system described in FIG. 1.

FIG. 2 illustrates an example environment 200 showing exemplary inputs and outputs of the input phase module 114 of the network processing system 104, described in FIG. 1. In some instances, the network processing system 104 may be implemented as hardware circuitry on one or more computing devices in, or associated with, the network 102 (e.g., a single device or a system of devices), host device 126.

As illustrated, the input phase module 114 may include event key generator 108, TCAM 116. In some examples, the input phase module 114 further comprises index generator 204. For instance, index generator 204 may correspond to multiplexers present at the output of the TCAM 116, as described above.

As illustrated in FIG. 2, the event key generator 108 may receive the network packet 106 and a current state 202 as inputs. In some examples, the current state 202 corresponds to an internal state and may be received from current state module 110 described herein.

The event key generator 108 may generate event key 112 based on the current state 202 and the data of the network packet 106. In some examples, the event key generator may encode the current state 202 and the data into an event and may present the event in the form of a key (e.g., as an event key) at the inputs of the TCAM 116. As illustrated, event key 112 comprises a plurality of bits, where each bit may represent an "event" associated with the network packet. For instance, a first bit of the event key 112 may correspond to a sequence number of the network packet 106.

As illustrated, the TCAM 116 may receive the event key 112 as input. The TCAM 116 may comprise a plurality of entries (illustrated as "[0]", "[1]", "[2]", . . . , "[N]"). Each entry may comprise one or more bit(s). In some examples, each bit within an entry of the TCAM 116 represents logical information associated with a network packet and/or current state 202. For instance, a first bit may represent a state of the TCP connection. For instance, the TCP connection may comprise 1 of 10 possible states. Accordingly, the first bit may be set to 1 of the 10 possible TCP states. A second bit may indicate whether the sequence number of the network packet is received is in order, a third bit may indicate if the sequence number is out of order, and a fourth bit may indicate whether there is no data received at all. In some examples, each TCAM entry has a width equal to the width of the event key bits.

In some examples, at each bit location within the mask of a particular TCAM entry, the values may comprise 1 of 3 states, (e.g., 0, 1 or X (implying don't-care)). For example, where mask bit [i]==0 results in a bit-wise match if the value of key bit [i] presented is 0; where mask bit [i]==1 results in a bit-wise match if the value of key bit [i] presented is 1; and/or where mask bit [i]==X results in a bit-wise match for key bit [i] values={0, 1}.

In some examples, the TCAM is configured to perform a lookup process using the event key. In some examples, individual bits of the key are matched against all the bits of each TCAM entry in parallel. For example, if the $4^{th}$ bit of an event key is "0" and if the 7th TCAM entry has a mask with its $4^{th}$ bit of value "0" or "X", then it results in a bit-wise match. On the other hand, if the $7^{th}$ TCAM entry has a mask with its $4^{th}$ bit of value "1", then it will not result in a bit-wise match. In some examples, the lookup process within the TCAM 116 is configured to establish a mapping between each event key bit and an index location.

As illustrated, the TCAM 116 may output results indicating either a "hit" on a specific entry index within the TCAM 116 or a "miss" (e.g., indicating that no TCAM entry index matching with the presented TCAM key). In some examples, each TCAM entry's mask may represent a condition with as many bits as there exists in the event key. Accordingly, in order for a TCAM entry to match a presented key, the lookup process may determine there is a bit-wise match across all bits within that mask relative to the bit of the event key 112 presented.

In some examples, the contents of the TCAM may be viewed as a large "if-elseif . . . elseif . . . else . . . " construct, where each entry may correspond to a logical condition. For instance, comparing the event key 112 to each entry within the TCAM 116 may be equivalent to determining "if (condition$_0$) index: =0; else if (condition$_1$) index: 1; . . . else index: N-1" where the range of index values is: {0 . . . . N-1} and where N is the size of the number of entries in the SRAM. In this example, if a particular event key 112 results in a lookup match on index=i, it implies that the logical condition: (!condition$_0$ && !condition$_1$ & & !condition$_{i-1}$ & & condition$_i$) is satisfied, i.e., the key failed to satisfy the conditions 0 . . . (i-1) and did satisfy condition$_i$. In this way, the contents of the TCAM 116 may be utilized as a large "if-elseif . . . elseif- . . . else . . . " construct, that outputs index 118, which maps to an index location of an action to be taken for processing event key 112.

As illustrated in FIG. 2, each TCAM entry's "hit" or "miss" status may be output to index generator 204. In some examples, the index generator 204 may generate index 118. For instance, index generator 204 may generate index 118 based at least in part on combining the results of the lookup process. In some examples and as noted above, the index generator 204 may output the index 118 to output phase module 120.

In this way, the system may utilize a TCAM to enable dynamic reprograming of the "if/then/else" construct in order to reroute events to actions.

Figure 3:
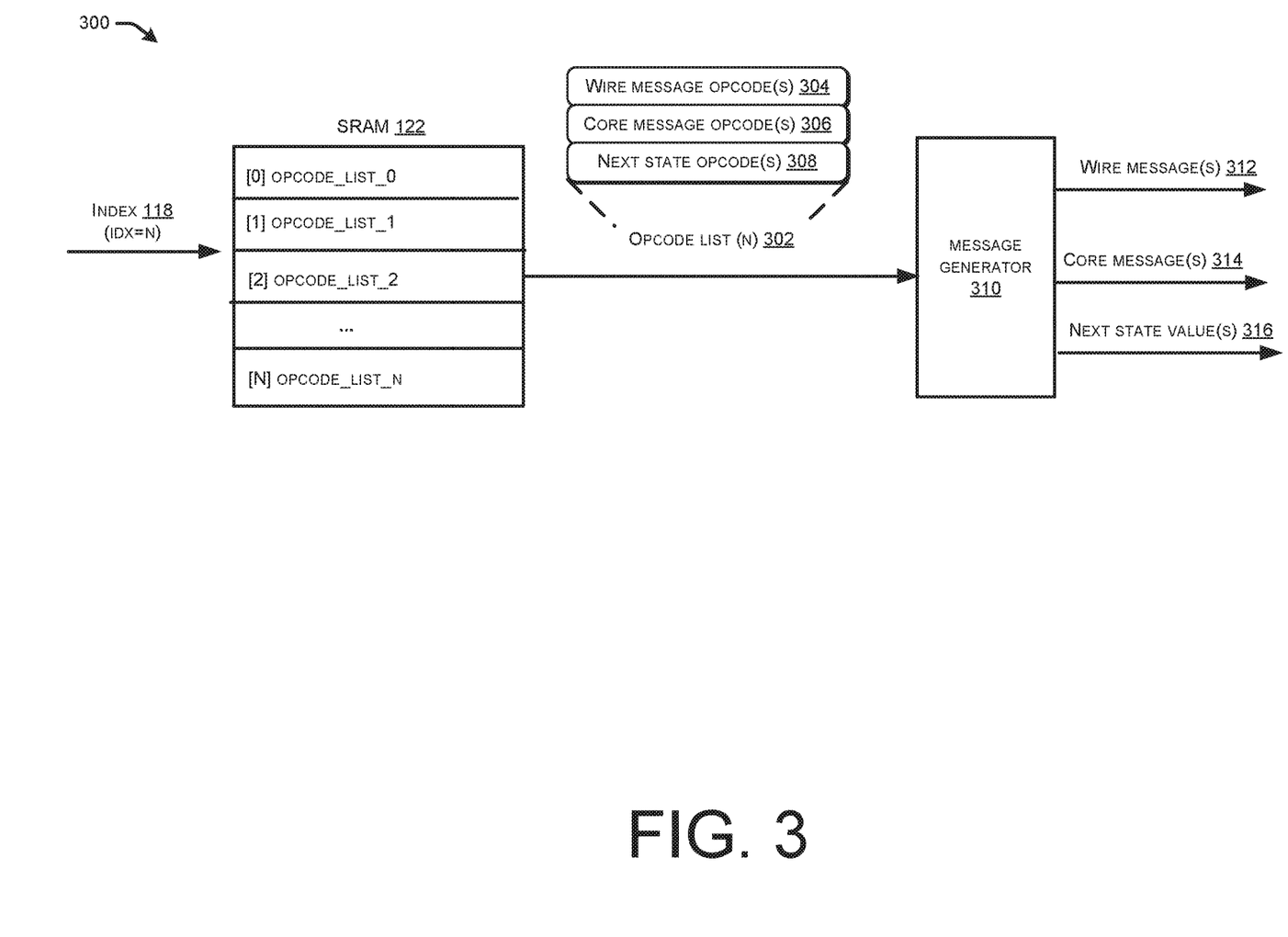
FIG. 3 illustrates an example environment showing exemplary inputs and outputs of the output phase module of the network processing system, as described in FIG. 1 and with reference to FIG. 2.

FIG. 3 illustrates an example environment 300 showing exemplary inputs and outputs of the output phase module 120 of the network processing system 104, as described in FIG. 1 and with reference to FIG. 2. In some instances, the network processing system 104 may be implemented as hardware circuitry on one or more computing devices in, or associated with, the network 102 (e.g., a single device or a system of devices) and/or host device 126.

As illustrated, the output phase module 120 may comprise SRAM 122. In some examples, the output phase module may further comprise message generator 310. As described above, the SRAM 122 may receive index 118 as an input. For instance, the SRAM 122 may receive the index 118 via a read address bus of the SRAM 122.

As illustrate, the SRAM 122 may comprise a plurality of index locations (illustrated as "[0]", "[1]", "[2]", . . . , "[N]"), each of which may comprise different opcode list(s). For instance, index location "0" may comprise "opcode_list_0". Index location "1" may comprise "opcode_list_1". In some examples, "opcode_list_0" may comprise one or more processing actions. In some examples, one or more of the processing actions included in "opcode_list_0" may be different from the one or more processing actions included in "opcode_list_1". As illustrated example, index 118 comprises "idx=N". In this example, index 118 may map to index location "N" within the SRAM 122, which comprises "opcode_list_N". In some examples, the SRAM 122 may perform a read operation to identify "opcode_list_N" associated with index 118.

As illustrated in FIG. 3, the SRAM 122 may output opcode list N 302 (c . . . g, "opcode_list_N") to message generator 310. As noted above and illustrated in FIG. 3, opcode list N 302 may comprise one or more of wire message opcode(s) 304, core message opcode(s) 306, and/or next state opcode(s) 308. Wire message opcode(s) 304 may comprise action opcodes that generate messages to the network 102. Core message opcode(s) 306 may comprise action opcodes that generate messages to host device 126. Next state opcode(s) 308 may comprise action opcodes that determine next state transitions (e.g., next state value(s) 316) and may generate messages to current state module 110.

In the illustrated example, opcode list N is input into message generator 310. In some examples, message generator 310 may comprise one r more demultiplexers. In some examples, message generator 310 is configured to decode opcode list N 302 and generate message(s) associated with the opcode(s) included in opcode list N 302. For instance, the one or more demultiplexers may translate the action opcode types into the wire message(s) 312, core message(s) 314, and/or next state value(s) 316 (e.g., indicating a next state transition).

In this way, the system may encode "actions" within the SRAM. Accordingly, the system may dynamically modify one individual aspect of an action's wire message generation or host message generation or "next" state transition without perturbing other action opcodes present within the same index location.

Figure 4:
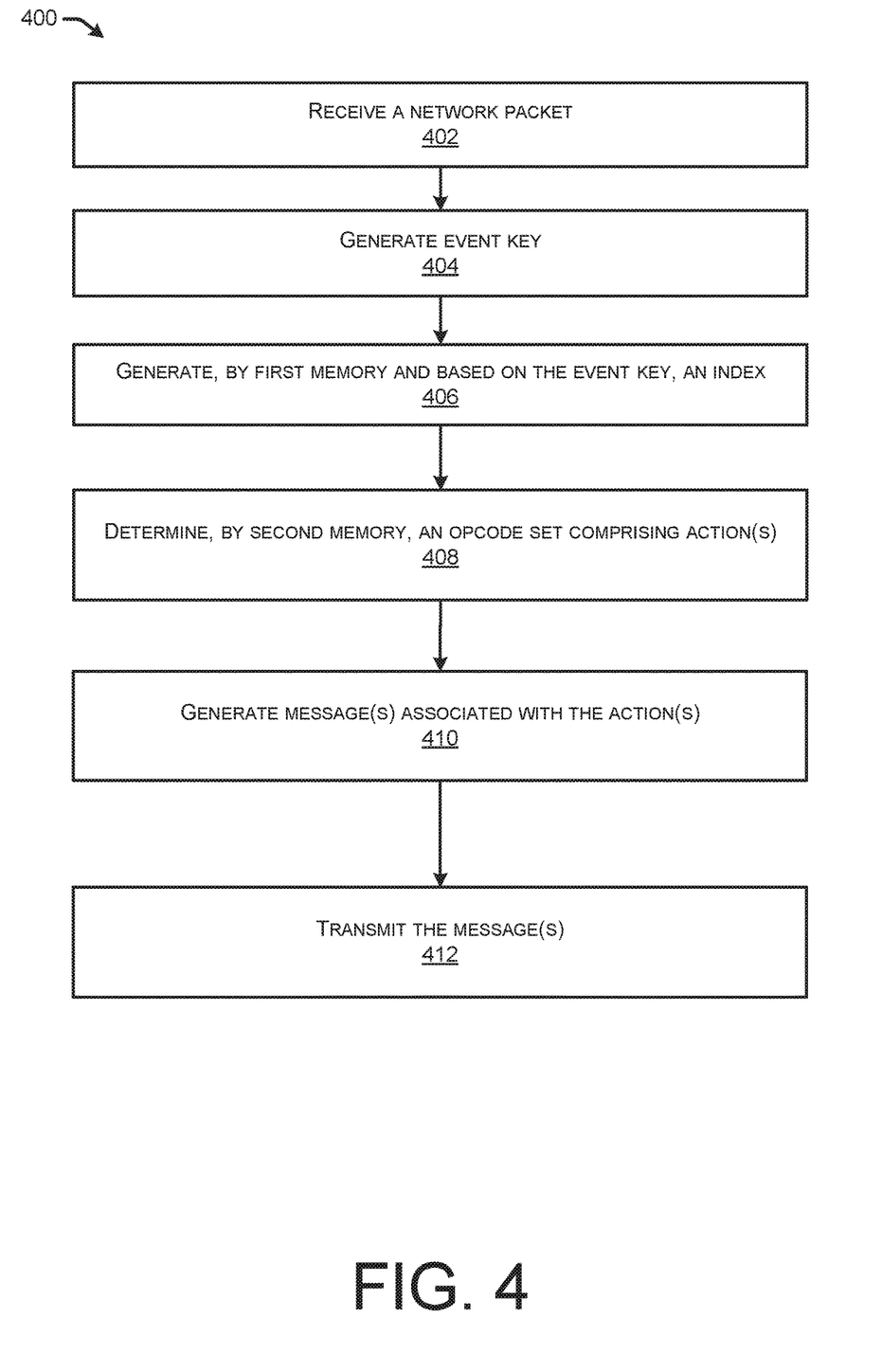
FIG. 4 illustrates a flow diagram of an example method for enabling programmable processing of network packets, in accordance with the system described in FIGS. 1-3.

FIG. 4 illustrates a flow diagram of an example system 400 for enabling programmable processing of network packets, in accordance with the system described in FIGS. 1-3. In some instances, one or more of the steps of system 400 may be performed by one or more devices (e.g., host device 126, network processing system 104, etc.) that include one or more processors and one or more non-transitory computer-readable media storing computer-executable instructions that, when executed by the one or more processors, cause the one or more processors to perform operations of system 400. In some examples, the system 400 may be implemented, in whole or in part, by computer networking circuitry and/or hardware circuitry.

At 402, the system may receive a network packet. For instance, the system may receive the network packet 106 via a network connection that utilizes transmission control protocol (TCP). In some examples, the system receives a current state of the network connection. For instance, the system may receive current state 202 from current state module 110.

At 404, the system may generate an event key. For instance, the system may generate event key 112 using event key generator 108. In some examples, the system may generate the event key 112 as part of a first processing phase. For instance, the first processing phase may be performed by the input phase module 114.

At 406, the system may generate, by first memory and based on the event key, an index. The first memory may comprise TCAM 116. For instance, as part of a first processing phase associated with the input phase module 114, the system may determine, using the event key 112, whether the event key 112 matches one or more conditions stored in the first memory.

In some examples, the system may generate, based on the event key and the one or more conditions, an index associated with the one or more conditions. In some examples, the one or more conditions correspond to a respective set of bits associated with a respective TCAM entry.

In some examples, the index 118 is generated by a multiplexer of the first memory and represents a first index location within the first memory at which the event key matches a condition (e.g., all the bits within the TCAM entry and/or matches the logical condition defined by the TCAM entry). In some examples, determining whether the event key matches the one or more conditions stored in the first memory comprises comparing one or more key bits of the event key to one or more mask bits of the first memory, wherein the one or more mask bits represent one or more conditions.

In some examples, the system may output, by the first memory, the index to second memory. For instance, the system may output the index to the output phase module 120 and/or a read data bus of the second memory.

At 408, the system may determine, by second memory, an opcode set comprising action(s). In some examples, the second memory may comprise SRAM 122. In some examples, the system may determine the opcode set when performing a second processing phase. For instance, the second processing phase may be performed by the output phase module 120.

In some examples, the second memory comprises a plurality of index locations comprising respective opcode sets, each opcode set encoding one or more processing actions. For instance, the one or more processing actions may comprise a first action opcode to generate a first message to a network, a second action opcode to generate a second message to a host device, or a third action opcode to generate a third message to update the state of the network connection.

At 410, the system may generate message(s) associated with the action(s). For instance, the system may generate the message(s) using message generator 310. In some examples, generating the one or more messages comprises: translating, using a demultiplexer of the second memory, the opcode set to generate one or more action types; identifying, based on the one or more action types, one or more message types; and generating the one or more messages based on the one or more message types.

At 412, the system may transmit the message(s). For instance, the system may transmit the message(s) using message generator 310. In some examples, the system may transmit the message(s) to one or more recipients (e.g., the network, host device, and/or current state module 110).

In some examples, the system may receive first instructions to change a first condition of the one or more conditions in the first memory to a second condition. For instance, the system may receive the instructions from a network administrator and/or the host device. In some examples, the instructions may correspond to a change in the "if/else/if" conditions stored within each entry of the TCAM. In response to receiving the instructions, the system may update the first condition to the second condition within the first memory. For instance, the system may replace the first condition with the second condition at the entry location within the TCAM. In some examples, the update may occur dynamically and/or in real-time.

As an example, the first condition may specify that when a first packet type is received, in order, and containing data, the corresponding index 118 that is generated will map to an action that generates a first wire message. In this example, the second condition may specify that when a second packet type is received, in order, and containing data, the corresponding index 118 that is generated will map to the action that generates the first wire message. Accordingly, when the system replaces the first condition with the second condition, the system changes the type of packet that results in the first wire message being generated.

In some examples, the system may receive instructions associated with updating an index location within the second memory. For instance, the system may receive instructions to change one or more of the action opcodes included in a particular opcode set at a particular index location. For instance, the instructions may specify to change a first wire message opcode to a second wire message opcode, such that a different wire message may be generated. In this example, the remaining opcode(s) (e.g., core message opcode(s) and/or next state opcode(s)) remain the same. Accordingly, the system may dynamically modify one individual aspect of an action opcode (e.g., such as a wire message generation, host message generation or next state transition) without changing the other action opcodes present within the same index location and/or same opcode set. In some examples, the system may receive the instructions as part of a software update, such that the changes may be implemented at runtime.

Figure 5:
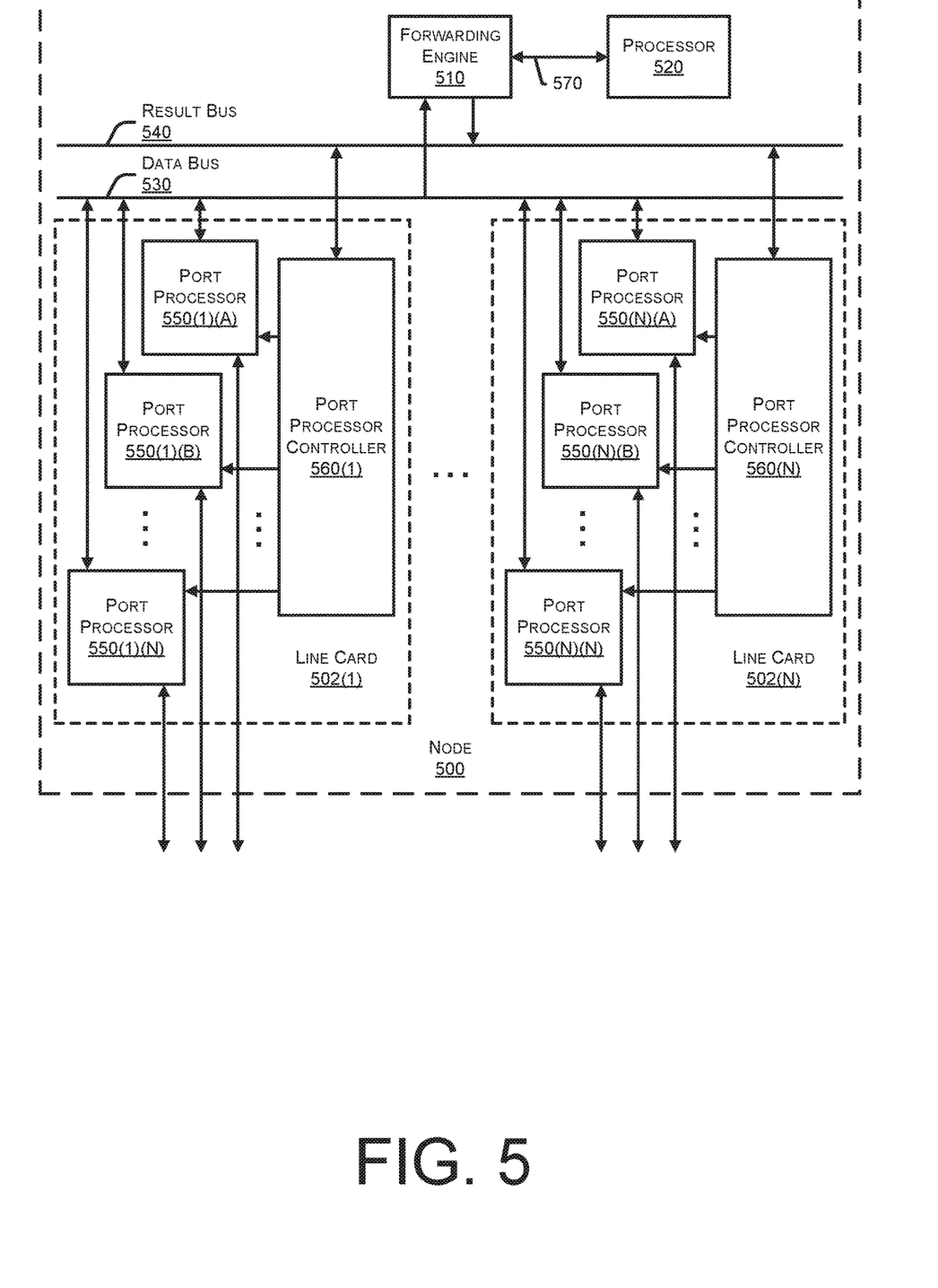
FIG. 5 illustrates a block diagram illustrating certain components of an example node that can be utilized to implement various aspects of the technologies disclosed herein.

FIG. 5 illustrates a block diagram illustrating certain components of an example node 500 that can be utilized to implement various aspects of the technologies disclosed herein. In some examples, node(s) 500 may be employed in various networks, such as, for example, network(s) 104 as described with respect to FIGS. 1-4.

In some examples, node 500 may include any number of line cards 502 (e.g., line cards 502(1)-(N), where N may be any integer greater than 1) that are communicatively coupled to a forwarding engine 510 (also referred to as a packet forwarder) and/or a processor 520 via a data bus 530 and/or a result bus 540. Line cards 502(1)-(N) may include any number of port processors 550(1)(A)-(N) (N) which are controlled by port processor controllers 560(1)-(N), where N may be any integer greater than 1. Additionally, or alternatively, forwarding engine 510 and/or processor 520 are not only coupled to one another via the data bus 530 and the result bus 540, but may also communicatively coupled to one another by a communications link 570.

The processors (e.g., the port processor(s) 550 and/or the port processor controller(s) 560) of each line card 502 may be mounted on a single printed circuit board. When a packet or packet and header are received, the packet or packet and header may be identified and analyzed by node 500 (also referred to herein as a router) in the following manner. Upon receipt, a packet (or some or all of its control information) or packet and header may be sent from one of port processor(s) 550(1)(A)-(N) (N) at which the packet or packet and header was received and to one or more of those devices coupled to the data bus 530 (e.g., others of the port processor(s) 550(1)(A)-(N) (N), the forwarding engine 510 and/or the processor 520). Handling of the packet or packet and header may be determined, for example, by the forwarding engine 510. For example, the forwarding engine 510 may determine that the packet or packet and header should be forwarded to one or more of port processors 550(1)(A)-(N) (N). This may be accomplished by indicating to corresponding one(s) of port processor controllers 560 (1)-(N) that the copy of the packet or packet and header held in the given one(s) of port processor(s) 550(1)(A)-(N) (N) should be forwarded to the appropriate one of port processor(s) 550(1)(A)-(N) (N). Additionally, or alternatively, once a packet or packet and header has been identified for processing, the forwarding engine 510, the processor 520, and/or the like may be used to process the packet or packet and header in some manner and/or maty add packet security information in order to secure the packet. On a node 500 sourcing such a packet or packet and header, this processing may include, for example, encryption of some or all of the packet's or packet and header's information, the addition of a digital signature, and/or some other information and/or processing capable of securing the packet or packet and header. On a node 500 receiving such a processed packet or packet and header, the corresponding process may be performed to recover or validate the packet's or packet and header's information that has been secured.

Figure 6:
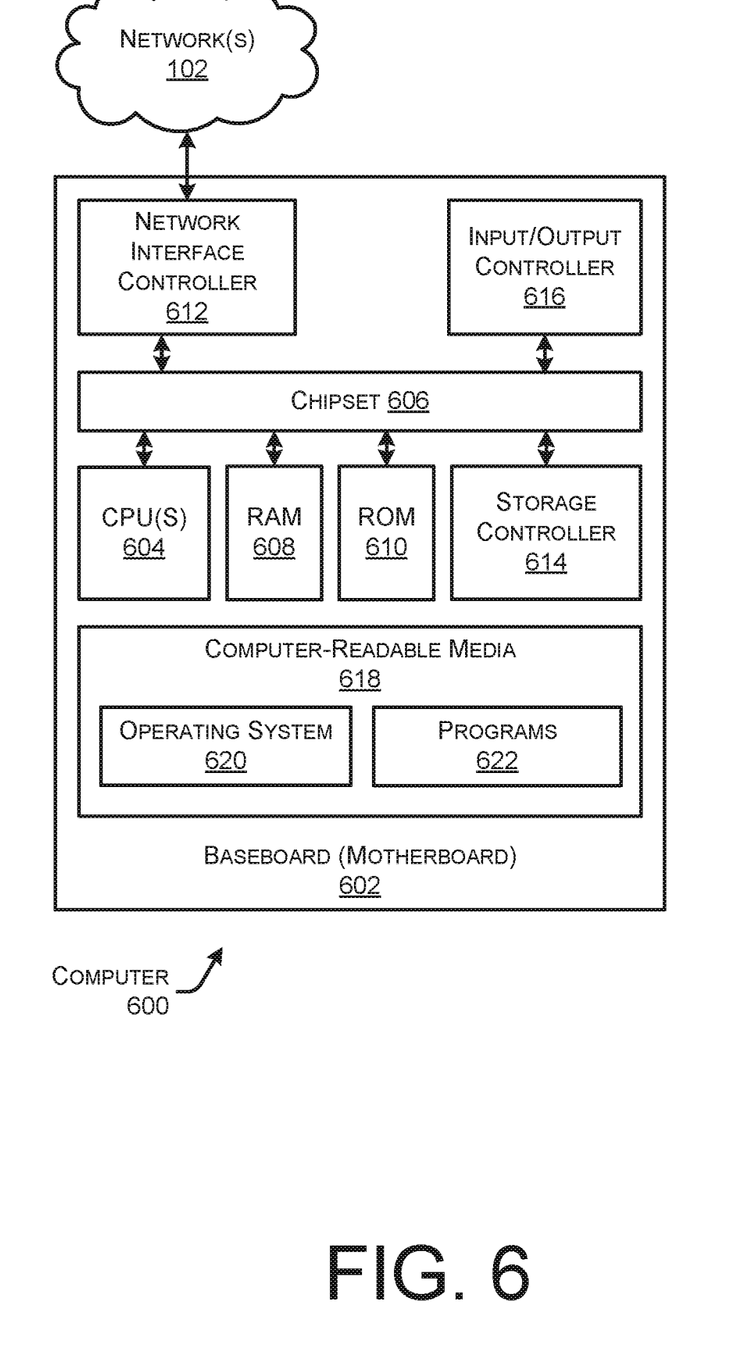
FIG. 6 is a computer architecture diagram showing an illustrative computer hardware architecture for implementing a device that can be utilized to implement aspects of the various technologies presented herein.

FIG. 6 shows an example computer architecture for a device capable of executing program components for implementing the functionality described above. The computer architecture shown in FIG. 6 illustrates any type of computer 600, such as a conventional server computer, workstation, desktop computer, laptop, tablet, network appliance, e-reader, smartphone, or other computing device, and can be utilized to execute any of the software components presented herein. The computer 600 may, in some examples, correspond to a host device 126, network processing system 104, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as network(s) 102. The chipset 606 can include functionality for providing network connectivity through a NIC 612, such as a gigabit Ethernet adapter. The NIC 612 is capable of connecting the computer 600 to other computing devices over the network 102. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the host device 126, network processing system 104, and/or any components included therein, may be supported by one or more devices similar to computer 600. Stated otherwise, some or all of the operations performed by the host device 126, network processing system 104, and/or any components included therein, may be performed by one or more computer devices.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-4. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a host device 126, network processing system 104, and/or any other device. The computer 600 may include one or more hardware processors (processors) configured to execute one or more stored instructions. The processor(s) may comprise one or more cores. Further, the computer 600 may include one or more network interfaces configured to provide communications between the computer 600 and other devices, such as the communications described herein as being performed by the host device 126, network processing system 104, and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure. For instance, the programs 622 may cause the computer 600 to perform techniques for facilitating dynamic and flexible programmability of processing network protocol packets. In some examples, the techniques may be implemented by computer networking circuitry. In some examples, the techniques may include receiving, via a network connection, a network packet; generating, based at least in part on the network packet and a current state of the network connection, an event key; performing, by first memory, a first processing phase comprising: determining, using the event key, whether the event key matches one or more conditions stored in the first memory; generating, based on the event key and the one or more conditions, an index associated with the one or more conditions; and outputting, by the first memory, the index to second memory; and performing, by the second memory, a second processing phase comprising: determining, based at least in part on the index, an opcode set comprising one or more actions; generating, one or more messages associated with the one or more actions; and transmitting the one or more messages to one or more recipients.

In this way, the computer 600 may process stateful network protocol packets in a dynamic and flexible manner. For instance, the computer may reprogram the mapping between individual events-derived from wire packet attributes and/or the internal protocol state (e.g., stored within the current state module)- and various types of protocol actions as well as dynamically reprogram the individual processing actions associated with these types of events. For instance, by utilizing a TCAM, the computer may dynamically reprogram this "if/then/else" construct in order to dynamically reroute events to different actions. Further, by encoding opcode sets into the SRAM, the system may enable an administrator to dynamically modify one individual aspect of an action opcode (e.g., such as a wire message generation, host message generation or next state transition) without changing the other action opcodes present within the same index location and/or same opcode set.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented by computer networking circuitry, the method comprising:
   receiving, via a network connection, a network packet;
   generating, based at least in part on the network packet and a current state of the network connection, an event key;
   performing, by first memory, a first processing phase comprising:
      determining, using the event key, whether the event key matches one or more conditions stored in the first memory;
      generating, based on the event key and the one or more conditions, an index associated with the one or more conditions; and
      outputting, by the first memory, the index to second memory; and
   performing, by the second memory, a second processing phase comprising:
      determining, based at least in part on the index, an opcode set comprising one or more actions;
      generating, one or more messages associated with the one or more actions; and
      transmitting the one or more messages to one or more recipients.

2. The method of claim 1, wherein the index is generated by a multiplexer of the first memory and represents a first index location within the first memory at which the event key matches a condition.

3. The method of claim 1, wherein generating the one or more messages comprises:
   translating, using a demultiplexer of the second memory, the opcode set to generate one or more action types;
   identifying, based on the one or more action types, one or more message types; and
   generating the one or more messages based on the one or more message types.

4. The method of claim 1, wherein the first memory comprises a 3-state Ternary Content-Addressable Memory and the second memory comprises a Static Random Access Memory.

5. The method of claim 1, wherein determining whether the event key matches the one or more conditions stored in the first memory comprises comparing one or more key bits of the event key to one or more mask bits of the first memory, wherein the one or more mask bits represent the one or more conditions.

6. The method of claim 1, wherein the second memory comprises a plurality of index locations comprising respective opcode sets, each opcode set encoding one or more processing actions.

7. The method of claim 6, wherein the one or more processing actions comprise a first action opcode to generate a first message to a network, a second action opcode to generate a second message to a host device, or a third action opcode to generate a third message to update the current state of the network connection to a next state.

8. The method of claim 1, further comprising:
   receiving first instructions to change a first condition of the one or more conditions in the first memory to a second condition; and
   updating, in response to receiving the first instructions, the first condition to the second condition within the first memory.

9. A system comprising:
   one or more processors; and
   one or more non-transitory computer-readable media storing instructions executable by the one or more processors, wherein the instructions program the one or more processors to perform operations comprising:
      receiving, via a network connection, a network packet;
      generating, based at least in part on the network packet and a current state of the network connection, an event key;
      performing, by first memory, a first processing phase comprising:
         determining, using the event key, whether the event key matches one or more conditions stored in the first memory;
         generating, based on the event key and the one or more conditions, an index associated with the one or more conditions; and
         outputting, by the first memory, the index to second memory; and
      performing, by the second memory, a second processing phase comprising:
         determining, based at least in part on the index, an opcode set comprising one or more actions;
         generating, one or more messages associated with the one or more actions; and
         transmitting the one or more messages to one or more recipients.

10. The system of claim 9, wherein the index is generated by a multiplexer of the first memory and represents a first index location within the first memory at which the event key matches a condition.

11. The system of claim 9, wherein generating the one or more messages comprises:
    translating, using a demultiplexer of the second memory, the opcode set to generate one or more action types;
    identifying, based on the one or more action types, one or more message types; and
    generating the one or more messages based on the one or more message types.

12. The system of claim 9, wherein the first memory comprises a 3-state Ternary Content-Addressable Memory and the second memory comprises a Static Random Access Memory.

13. The system of claim 9, wherein determining whether the event key matches the one or more conditions stored in the first memory comprises comparing one or more key bits of the event key to one or more mask bits of the first memory, wherein the one or more mask bits represent the one or more conditions.

14. The system of claim 9, wherein the second memory comprises a plurality of index locations comprising respective opcode sets, each opcode set encoding one or more processing actions.

15. The system of claim 14, wherein the one or more processing actions comprise a first action opcode to generate a first message to a network, a second action opcode to generate a second message to a host device, or a third action opcode to generate a third message to update the current state of the network connection to a next state.

16. The system of claim 9, the operations further comprising:
    receiving first instructions to change a first condition of the one or more conditions in the first memory to a second condition; and
    updating, in response to receiving the first instructions, the first condition to the second condition within the first memory.

17. One or more non-transitory computer-readable media maintaining instructions that, when executed by one or more processors, program the one or more processors to perform operations comprising:

receiving, via a network connection, a network packet;

generating, based at least in part on the network packet and a current state of the network connection, an event key;

performing, by first memory, a first processing phase comprising:

determining, using the event key, whether the event key matches one or more conditions stored in the first memory;

generating, based on the event key and the one or more conditions, an index associated with the one or more conditions; and         outputting, by the first memory, the index to second memory; and     performing, by the second memory, a second processing phase comprising:

determining, based at least in part on the index, an opcode set comprising one or more actions;

generating, one or more messages associated with the one or more actions; and         transmitting the one or more messages to one or more recipients associated with the network connection.

18. The one or more non-transitory computer-readable media of claim 17, wherein the index is generated by a multiplexer of the first memory and represents a first index location within the first memory at which the event key matches a condition.

19. The one or more non-transitory computer-readable media of claim 17, wherein the first memory comprises a 3-state Ternary Content-Addressable Memory and the second memory comprises a Static Random Access Memory.

20. The one or more non-transitory computer-readable media of claim 17, the operations further comprising:

receiving first instructions to change a first condition of the one or more conditions in the first memory to a second condition; and     updating, in response to receiving the first instructions, the first condition to the second condition within the first memory.

* * * * *